United States Patent [19]

Norback

[11] 4,099,928
[45] Jul. 11, 1978

[54] METHOD OF MANUFACTURING A HEAT EXCHANGER BODY FOR RECUPERATIVE EXCHANGERS

[75] Inventor: Per S. Norback, Lidingö, Sweden

[73] Assignee: Aktiebolaget Carl Munters, Sollentuna, Sweden

[21] Appl. No.: 705,536

[22] Filed: Jul. 15, 1976

[30] Foreign Application Priority Data

Jul. 18, 1975 [SE] Sweden ............................. 7508256

[51] Int. Cl.$^2$ ........................................... B21D 53/00
[52] U.S. Cl. ........................ 29/157.3 D; 113/118 D
[58] Field of Search ............ 29/157.3 D; 113/118 C, 113/118 D, 1 C; 165/166; 228/183

[56] References Cited

U.S. PATENT DOCUMENTS

| | | | |
|---|---|---|---|
| 1,037,754 | 9/1912 | Gildersleeve | 113/118 D |
| 2,591,994 | 4/1952 | Alexander | 113/118 D X |
| 2,912,749 | 11/1959 | Bauernfeind et al. | 29/157.3 D |
| 2,927,369 | 3/1960 | Coblentz et al. | 113/118 D X |
| 3,241,607 | 3/1966 | Rutledge | 165/166 |
| 3,375,570 | 4/1968 | Dubusher | 228/183 |
| 3,982,981 | 9/1976 | Takao et al. | 165/166 X |
| 3,995,688 | 12/1976 | Darm | 29/157.3 D |

*Primary Examiner*—Leon Gilden
*Attorney, Agent, or Firm*—Eric Y. Munson

[57] ABSTRACT

Method of manufacturing a heat exchanger body composed of a plurality of facially-opposed corrugated rectangular sheets of a deformable material with corrugations in alternate sheets crossing the corrugations in the intervening sheets and forming a series of channels through which two streams of gaseous medium are forced crosswise in heat exchange relationship with one another. The juxtaposed edges of the sheets are displaced so that the edges on the same side of the body are alternately sealed and form openings therebetween for admission of the gaseous media into the channels. The edges of the corrugated sheets, prior to being assembled into a heat exchange body, are pressed flat, with flat edges at two of the opposite sides extending substantially in the same plane and the contiguous flat edges at the other two opposite sides being displaced relative to the plane of the first two opposite edges.

11 Claims, 10 Drawing Figures

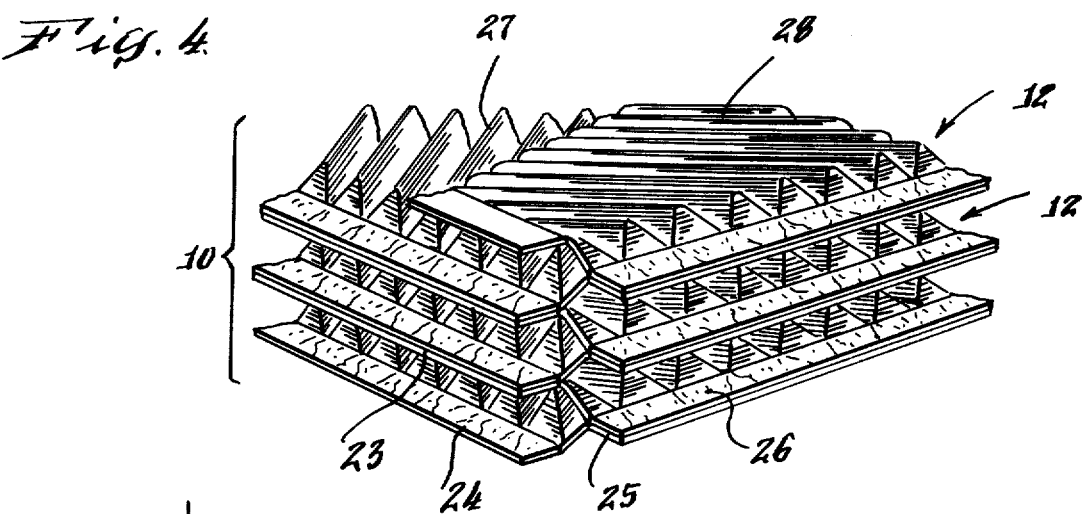
Fig. 4.
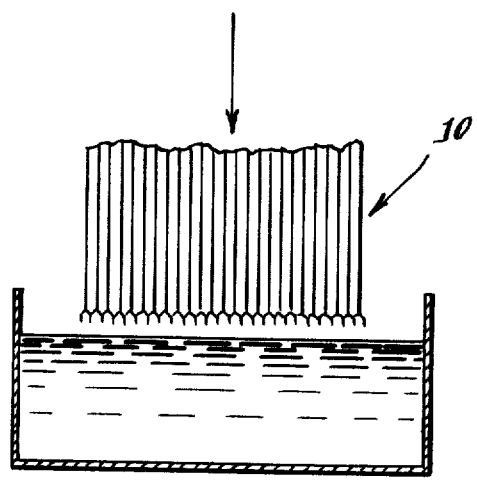
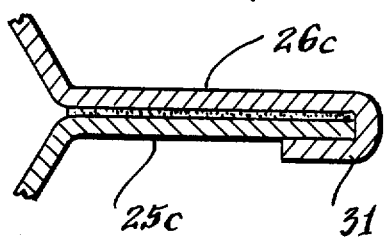
Fig. 7.
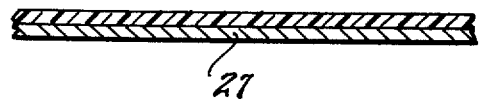
Fig. 6.
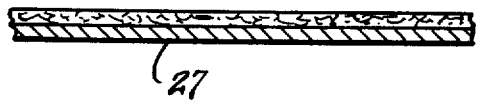
Fig. 9.
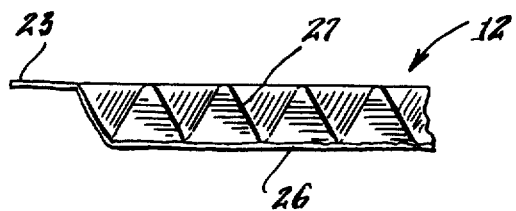
Fig. 10.

METHOD OF MANUFACTURING A HEAT EXCHANGER BODY FOR RECUPERATIVE EXCHANGERS

The present invention relates to a method of manufacturing a heat exchanger body for recuperative exchangers as described in the ingress to claim 1.

BACKGROUND OF THE INVENTION

Heat exchanger bodies of the type described can be made from a number of corrugated sheets, e.g. by pressing or stamping the sheets, or by vacuum forming in the case of plastic sheets, after which the sheets are assembled and joined to form the exchanger body. This method of manufacture has a number of drawbacks. If the sheets are produced by pulling the web of sheet material into the groove of the mold by means of battens as disclosed by U.S. Pat. Nos. 3,682,247 and 3,969,473, their thickness must be chosen to guarantee adequate strength to resist the stretching which the material undergoes during forming, in order to avoid rupture of the material and other undesirable damage thereto. This often means that the sheets must be thicker than normally would be required for their intended application in the heat exchanger body, and this makes the construction unnecessarily heavy and expensive. Moreover, the use of a single forming tool to carry out both corrugation and edging of the sheets limits the dimensions of the heat exchanger body, since one is bound to the dimensions of the form when producing the sheets.

The purpose of the present invention is to improve the method of manufacturing heat exchanger bodies, eliminating the above drawbacks and permitting the sheets to be produced and assembled into a heat exchanger body of any dimensions in a simple, labor-saving, and inexpensive manner.

This purpose is achieved by giving the invention the characteristics specified in the claims listed hereinafter.

BRIEF DESCRIPTION OF THE DRAWINGS

The following paragraphs, in combination with the drawings, describe the manufacture of a heat exchanger body in accordance with the invention.

FIG. 4 is a perspective view of a corner portion of the heat exchanger body, showing a number of assembled sheets.

FIG. 6 is a schematic view illustrating how the edges of the exchanger body are sealed by immersing them in a channel containing a bath of the sealing compound.

FIG. 7 is a cross-sectional view of the modification showing an alternate method of joining the bearing edge of neighboring sheets.

FIG. 8 is a cross-sectional view showing the use of a metallic foil coated with a plastic material.

FIG. 9 is a cross-sectional view similar to FIG. 8 showing the metallic foil coated with an absorbent material, and FIG. 10 is a fragmentary elevational view showing how the edges may be compressed so that they lie in a plane coinciding with the ridges and valleys of the corrugations.

DESCRIPTION OF A PREFERRED EMBODIMENT WITH POSSIBLE MODIFICATIONS

Figure 1:
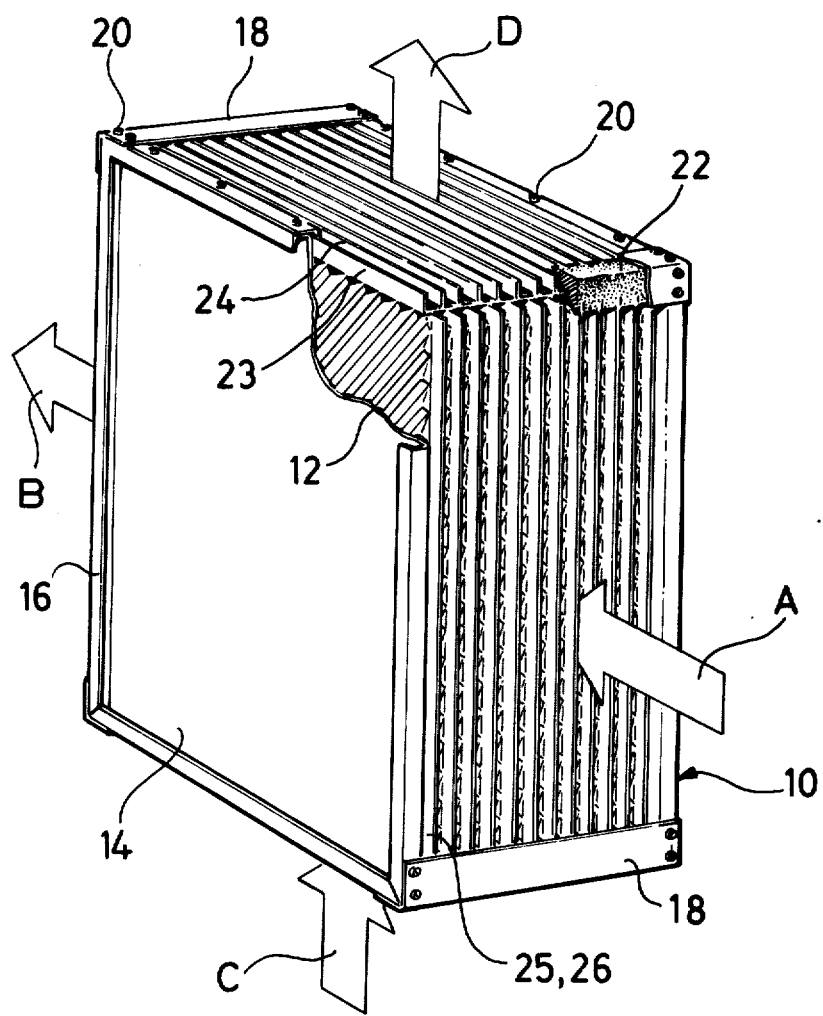
FIG. 1 is a perspective drawing of a heat exchanger body manufactured in accordance with the invention and provided with a rigid frame, for use in, e.g., a recuperative heat exchanger.

The heat exchanger core shown in FIG. 1 consists of a package or body 10 composed of a number of juxtaposed single sheets 12. All the sheets in the heat exchanger body 10 are creased or corrugated to form channels for allowing the heat exchange media to flow through, the corrugations in alternate sheets being parallel and running at an angle to the corrugations in the intervening sheets.

The edges of the sheets 12 are joined in such a way that the edges 23, 24 along two opposite ends, for example the upper and lower ends, form a lengthwise opening to admit a heat exchange medium, while the edges 25, 26 along the other, vertical ends, are hermetically sealed to prevent the entrance of any medium through these ends. Thus, each pair of neighbouring sheets forms a cell which is open along two opposite ends and sealed along the other two ends, and the corrugations 27, 28 in the sheets 12 (FIG. 4) form channels which conduct the two heat exchange media through the cell. The channels extend throughout the area of the exchanger body, their width varying from zero, at the points where the sheets are in contact, to twice the height of the corrugations. The height of the corrugations may lie between 1 and 20 mm, and should preferably lie between 5 and 15 mm.

The body 10 is enclosed between plates 14 covering the outside sheets 12, and these plates 14 and the package 10 are held together by edge frames 16 and transverse L-irons 18, which are interconnected by means of screws 20 or similar connecting elements. A core formed in this way can be used in recuperative heat exchangers, preferably for the exchange of heat between two gaseous media, one of which may enter, for instance, at arrow A and flow out at arrow B, while the other flows in at arrow C and leaves the heat exchanger core at arrow D. Thus the two gaseous media will flow crosswise to cross each other as they pass through channels of the core, and, consequently a heat exchange will take place between the two media, though without any direct contact between them. Obviously the directions of flow may vary from those described above if desired. An important detail in order to ensure a hermetic seal between the flow chambers formed in the package is the sealing of the transverse edges of the exchanger body 10. This is assured by a bead 22 of sealing material applied to each of the transverse edges covered by the L-irons 18, as will be described in detail below.

Figure 2:
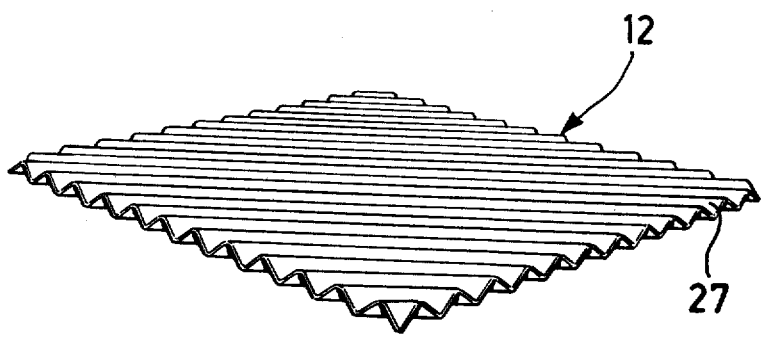
FIGS. 2 and 3 are perspective views of a sheet embodied in the heat exchanger body shown in FIG. 1, at two successive steps in the method of manufacture.

The starting point in making the heat exchanger body is corrugated sheets 12, such as are shown in FIG. 2. The sheet 12 is produced in a manner known per se by creasing or corrugating a web of sheet material, which before or after corrugation is cut into the desired lengths, depending on the dimensions of the exchanger body. The sheet is of metal foil of thickness between 0.05 and 0.5 mm. preferably 0.1 mm. If either of the heat exchange media may be expected to contain moisture of other corrosive components, the metal foil may be coated with a suitable material, such as plastic, for example polyvinyl chloride or polyethylene. In certain applications the sheet may also be given an absorbent coating.

Figure 3:
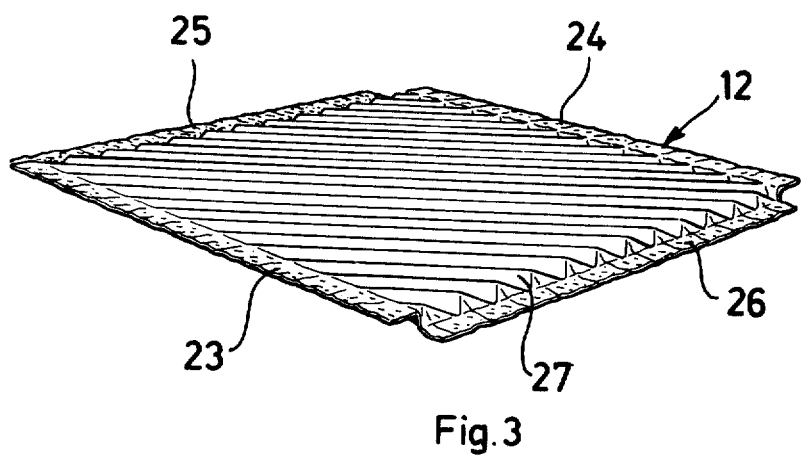

As appears from FIG. 3, the next step in the manufacture is to compress and flatten the edges, for example, crimping, rolling, milling, or the like. The edges 23 – 26 may be compressed singly, in pairs, or all four at once. As the figure shows, compression is accompanied by displacement of the pairs of oppositely extending juxtaposed edges, so that edges 23, 24 will lie in one plane, while edges 25, 26 will lie in a plane separated from the first plane by a distance equal to the height of the corrugations, which may be between 1 and 20 mm, as mentioned above. The edges should preferably be compressed so as to lie in a plane coinciding with that of the seals and bottoms of the corrugations.

The significance of the described forming method resides in the fact that the sheets do not need to be stretched, but retain an even thickness. The forming of the edges, in particular, is a problem here, since the surfaces are buckled in two directions. The described method permits the use of very thin foil, since no pulling or stretching takes place which might cause holes or ruptures. This makes it possible to make an exchanger body of reduced weight with minimized use of material. This is of great importance, since weight is a factor with regard to transportation. In case the foil is coated as stated above, the risk of ruptures in the coating which might adversely affect the performance thereof will also be minimized. Both the foil and the coating may be made of materials with intrinsically very low ductility, which fact permits a freer choice of materials than would be possible if they were to be subjected to severe stretching.

FIG. 4 shows a number of sheets 12 which have been superimposed in the first stages of the construction of a heat exchanger body. The sheets 12 are laid so that the creases or corrugations 27, 28 cross each other and so that at one end the juxtaposed edges 25, 26 of two neighbouring sheets lie in the same plane, while the other pair of juxtaposed edges 23, 24 are separated by a distance equal to twice the height of the corrugations. The pair of edges 25, 26 lying in the same plane will then be hermetically sealed, as described in more detail below, while the other pair of edges 23, 24 will form an opening through which one of the heat exchanger media can enter the body 10.

Figure 5:
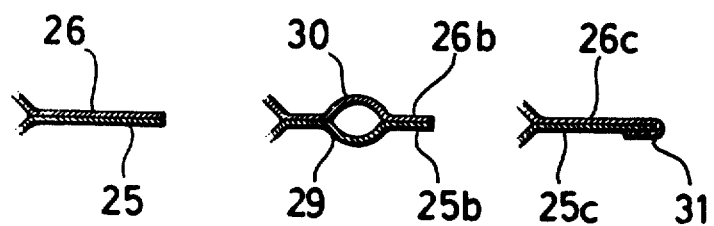
FIG. 5 shows different ways of joining the juxtaposed edges of adjoining sheets in the body.

The joining of the edges, for example, 25, 26, can be carried out in a variety of ways, as shown in FIGS. 5a – c. In FIG. 5a the juxtaposed edges 25, 26 are joined by gluing, soldering, welding, or the like. In the case of gluing, the glue may be applied to the edges before the sheets are laid together. In a preferred method, however, all the sheets 12 are assembled to form a heat exchanger body 10, and then the whole of one end of the body is immersed with edges 23, 24 or 25, 26 in a bath of the liquid or molten joining material, such as glue, solder, or the like, so that all the edges along one end of the body are coated with the material simultaneously, and the space between the abutting, flattened edges is filled with the joining material so that a perfect seal is obtained.

In FIG. 5b, the edges 25b, 26b are joined in a similar manner to FIG. 5a, i.e. by gluing, soldering, or the like, but in this case, to improve rigidity, the edges are provided with grooves or beads 29, 30 projecting in opposite directions.

In the alternative of FIG. 5c, the edges 25c, 26c are joined by folding: one edge, e.g. 26c, is extended to form a projecting strip 31, which is then folded over the other edge 25c. Obviously, the joint formed in this way can be reinforced by gluing or soldering if this is necessary in order to seal the joint.

After the sheets 12 have been assembled into the heat exchanger body 10 and joined in one of the ways described, the transverse edges of the body 10 must be sealed to prevent communications between the two systems of channels which have been formed inside the body. This object can be achieved by placing the body with its transverse edges in a channel containing liquid or molten sealing material, such as thermoset, solder, or the like, each edge being lowered deep enough into the sealing material for the latter to form a bead 22 which will reliably seal the edge of the body 10, as shown in FIG. 1. The edge is allowed to remain in the channel until the sealing material has set.

If it is desired to produce an exchanger body without organic materials, all sealing and joining is carried out with metallic materials, while in other cases, as described above, plastics or other suitable materials may be used.

The invention is naturally not limited to the form of embodiment shown, but can be varied within the terms of the concept underlying the invention.

I claim

1. Method for manufacturing a heat exchanger body for recuperative heat exchangers for two gaseous media, which body is of the type containing a number of superimposed sheets which are corrugated to form channels for the media to flow through, the sheets being arranged so that the corrugations in neighbouring sheets cross each other to form channels passing through the heat exchanger body in two directions, and the juxtaposed edges of the sheets being displaced and joined to the corresponding edges of the neighbouring sheets so that the edges on the same side of the body alternately are sealed together and form openings to admit the heat exchange medium to the channels, characterized in that the sheets (12) are first corrugated all over and cut to the desired dimensions, and that the edges (23 –26) are then compressed flat in such a manner that opposite ends of the sheet are in the same plane and adjacent ends of the sheet are in different but parallel planes, and at the same time or subsequently the juxtaposed edges (23 and 24, or 25 and 26, respectively) are displaced in the same direction, but in the opposite direction to the other pair of juxtaposed edges (25 and 26, or 23 and 24, respectively), whereafter the desired number of sheets are assembled into the heat exchanger body (10) and those displaced edges of neighbouring sheets (12) which bear on each other are joined and sealed.

2. Method of claim 1, in which a joining material, is used to join and seal the edges, characterized in that the bearing edges (25, 26) at one end of the heat exchanger body (10) are joined simultaneously by immersing the edges in a bath of joining material.

3. Method of claim 1 characterized in that the bearing edges (25c, 26c) of the sheets (12) are joined by folding.

4. Method of claim 1, characterized in that the bearing edges (25c, 26c) of neighbouring sheets (12) are joined by folding in combination with gluing or soldering.

5. Method of claim 1, characterized in that the edges (25b, 26b) of the sheets (12) are provided before joining with a bead to improve rigidity.

6. Method of claim 1, characterized in that the edges of the manufactured heat exchanger body (10) are sealed by filling with a sealing compound (22) to such a thickness as will ensure that all communication between the crossing channels (27, 28) is excluded.

7. Method of claim 6, characterized in that the edges of the heat exchanger body are sealed by immersing the edges in a channel containing a bath of the sealing compound.

8. Method of claim 1 characterized in that the sheets (12) are manufactured from a metallic foil of thickness between 0.05 and 0.3 mm, preferably 0.1 mm.

9. Method of claim 8, characterized by the use of a metallic foil coated with a plastic, such as poly-vinyl chloride, polyethylene, or the like.

10. Method of claim 8, characterized by the use of a metallic foil coated with an absorbent material.

11. Method of claim 1, characterized by the compression of the edges so that they lie in a plane coinciding with the ridges and valleys of the corrugations.

* * * * *